(12) United States Patent
Sakkinen et al.

(10) Patent No.: US 9,597,988 B2
(45) Date of Patent: Mar. 21, 2017

(54) METHOD OF LASER WELDING TWIP STEEL TO LOW CARBON STEEL

(75) Inventors: Daniel James Sakkinen, Highland, MI (US); Ornela Zekavica, Novi, MI (US); Anthony Kestian, Highland, MI (US)

(73) Assignee: Johnson Controls Technology Company, Holland, MI (US)

( * ) Notice: Subject to any disclaimer, the term of this patent is extended or adjusted under 35 U.S.C. 154(b) by 1345 days.

(21) Appl. No.: 13/509,820

(22) PCT Filed: Nov. 16, 2010

(86) PCT No.: PCT/US2010/056872
§ 371 (c)(1),
(2), (4) Date: Aug. 3, 2012

(87) PCT Pub. No.: WO2011/060432
PCT Pub. Date: May 19, 2011

(65) Prior Publication Data
US 2012/0298637 A1 Nov. 29, 2012

Related U.S. Application Data

(60) Provisional application No. 61/261,483, filed on Nov. 16, 2009.

(51) Int. Cl.
*B60N 2/68* (2006.01)
*B23K 26/22* (2006.01)

(52) U.S. Cl.
CPC ............ *B60N 2/682* (2013.01); *B23K 26/211* (2015.10); *B23K 26/22* (2013.01); *B23K 26/244* (2015.10);
(Continued)

(58) Field of Classification Search
CPC combination set(s) only.
See application file for complete search history.

(56) References Cited

U.S. PATENT DOCUMENTS 4,117,302 A * 9/1978 Earle et al. .............. 219/121.64
4,588,440 A 5/1986 Simoneau
(Continued)

FOREIGN PATENT DOCUMENTS

JP 48-17450 3/1973
JP 08-001360 1/1996
(Continued)

OTHER PUBLICATIONS

Japanese Office Action, dated Aug. 16, 2013.
(Continued)

*Primary Examiner* — Dana Ross
*Assistant Examiner* — Renee Larose
(74) *Attorney, Agent, or Firm* — Butzel Long

(57) ABSTRACT

A method of laser welding structures having different steel grades together. The method includes providing a first structure made from a first steel grade and composition and providing a second structure made from a second steel grade composition. The first structure is positioned adjacent the second structure to create a weld zone area wherein at least a portion of the first structure overlaps at least a portion of the second structure. A filler material is selected that has a composition that will create a weld joint between the first structure, the second structure and the filler material such that the weld joint has a predetermined microstructure. The filler material is positioned adjacent the weld zone area. A laser beam is directed at the weld zone area to create a weld joint between the first structure, the second structure and the filler material, wherein the weld joint has a predetermined microstructure.

9 Claims, 13 Drawing Sheets

(52) U.S. Cl.
CPC .. *B23K 2201/006* (2013.01); *B23K 2201/185* (2013.01); *B23K 2203/18* (2013.01)

(56) References Cited

U.S. PATENT DOCUMENTS

| | | | |
|---|---|---|---|
| 7,241,971 | B2 | 7/2007 | Bonnet |
| 7,802,852 | B2 * | 9/2010 | Siegrist et al. .......... 297/452.18 |
| 8,187,721 | B2 * | 5/2012 | Geisler et al. ................. 428/594 |
| 8,485,606 | B2 * | 7/2013 | Geisler et al. ........... 297/452.18 |
| 2002/0043521 | A1 * | 4/2002 | Klein et al. .............. 219/121.64 |
| 2008/0041922 | A1 | 2/2008 | Forrest et al. |
| 2008/0164301 | A1 | 7/2008 | Nowak et al. |
| 2008/0265639 | A1 * | 10/2008 | Siegrist et al. ............ 297/217.3 |
| 2008/0296271 | A1 | 12/2008 | Klein et al. |
| 2009/0072601 | A1 * | 3/2009 | Geisler et al. ............. 297/284.1 |

FOREIGN PATENT DOCUMENTS

| | | |
|---|---|---|
| JP | 2000-117470 | 4/2000 |
| JP | 2001-334378 | 12/2001 |
| JP | 2004107710 A | 4/2004 |
| WO | WO 2008049639 | 5/2008 |
| WO | 2009095264 | 8/2009 |

OTHER PUBLICATIONS

English translation of Japanese Office Action, with a delivery date of Aug. 20, 2013.
Patent Abstract of Japan Publication No. 2000-117470, date of publication of application: Apr. 25, 2000.
Patent Abstract of Japan Publication No. 2001-334378, date of publication of application: Apr. 12, 2001.
Translation of "Notice of Reasons for Rejection," (Office Action), dated Jan. 28, 014.
Patent Abstract of Japan Publication No. 08-001360, date of publication of application: Jan. 9, 1996.
Sreenivasan, Narasimhan, "Effects of Laser Welding on Formability Aspects of Advanced High Strength Steel," thesis presented to the University of Waterloo, Waterloo, Ontario, Canada, 2007.
Haferkamp, H. et al., "Laser beam welding of new high strength steels for auto body construction," Key Engineering Materials, vol. 344, 2007, pp. 723-730, online at http://www.scientific.net, 2007 Trans Tech Publications, Switzerland.
Patent Abstract of Japan 2004-107710, Publication date Apr. 8, 2004, Title: Laser Welded Joint Article of Steel, 1 page.
Foreign Office Action dated Dec. 16, 2015, 6 pages.

* cited by examiner

METHOD OF LASER WELDING TWIP STEEL TO LOW CARBON STEEL

CROSS REFERENCE TO RELATED APPLICATIONS

This application claims the benefit of and priority to U.S. Provisional Application No. 61/261,483, filed Nov. 16, 2009, which is incorporated herein by reference.

BACKGROUND

The present disclosure relates generally to the field of laser welding together metal materials having differing characteristics and properties and then using the welded pieces in various applications. More specifically, this present disclosure relates to laser welding together a TWIP steel with a relatively low carbon steel.

DESCRIPTION OF THE RELATED ART

Laser welding does not require and does not use a filler material in joining two or more pieces of metal, such as steel, together. The laser beam melts the material (steel) of the pieces and then allows for solidification of the molten steel and thereby creates a solid joint, coupling, or bond between the pieces. When the steel is heated by the laser into a flowable (or relatively liquid) state, the two or more components (or pieces) being welded may create a new material, such as an alloy or the like, depending upon the properties of each separate material that is melted (i.e., the initial composition of the materials) and the final proportions present in the welded joint. Thus, laser welding of dissimilar materials results in an alloy of the two or more materials created in the liquid weld zone. When the weld zone solidifies, the newly created alloy will develop a microstructure based upon its new chemistry and the properties thereof will determine the characteristics of the welded joint.

Stainless steels are typically characterized, at least in part, by their base microstructure and the amount of chromium content by mass. Stainless steel generally does not stain, corrode or rust as easily as ordinary carbon steel but is not necessarily stain proof. Stainless steels are available as austenitic, ferritic, duplex (austenitic and ferritic), martensitic, or as a mixture of austenitic and martensitic microstructures. Twinning Induced Plasticity (TWIP) steel typically has an austenitic microstructure. While TWIP is not classified as a stainless steel, it has the similar austenitic microstructure as an austenitic stainless steel. The austenitic structure provides the steel with very good strength and exceptional ductility for certain applications. As with an austenitic stainless steel, the chemistry and microstructure of the TWIP steel makes it generally incompatible with low and medium carbon steels when it is attempted to join such materials together such as by welding (including in particular laser welding)

Accordingly, there remains a continuing need to provide an improved method of laser welding TWIP steel to other steel grades.

SUMMARY

Accordingly, the present disclosure relates to a method of laser welding structures having different steel grades together. The method includes providing a first structure made from a first steel grade and composition and providing a second structure made from a second steel grade composition. The first structure is positioned adjacent the second structure to create a weld zone area wherein at least a portion of the first structure overlaps at least a portion of the second structure. A filler material is selected that has a composition that will create a weld joint between the first structure, the second structure and the filler material such that the weld joint has a predetermined microstructure. The filler material is positioned adjacent the weld zone area. A laser beam is directed at the weld zone area to create a weld joint between the first structure, the second structure and the filler material, wherein the weld joint has a predetermined microstructure.

An advantage of the present disclosure is that TWIP steel may be laser welded together with other steel grades without suffering from brittle welds. Another advantage of the present disclosure is that the method creates a laser weld having a strong and ductile austenitic microstructure. Yet a further advantage of the present disclosure is that the method enhances the performance of seat structures having load carrying members such as welded seat frames, seat backs, seat bases, or the like.

Other features and advantages of the present disclosure will be readily appreciated, as the same becomes better understood after reading the subsequent description taken in conjunction with the accompanying drawings.

DESCRIPTION

Figure 1:
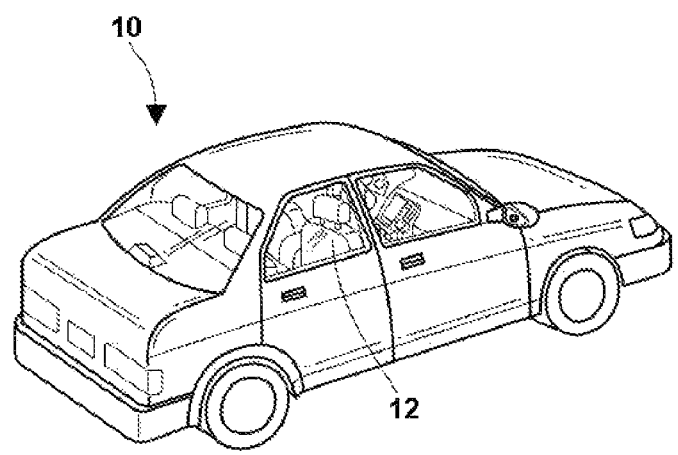
FIG. 1 is a perspective view of a vehicle, according to an exemplary embodiment.

Referring generally to the FIGURES and particularly to FIG. 1, a vehicle 10 is shown according to an exemplary embodiment. The vehicle 10 can include one or more seat assemblies 12 provided for occupant(s) of the vehicle 10. While the vehicle 10 shown is a four door sedan, it should be understood that the seat assembly 12 may be used in a mini-van, sport utility vehicle, airplane, boat, or any other type of vehicle.

Figure 2A:
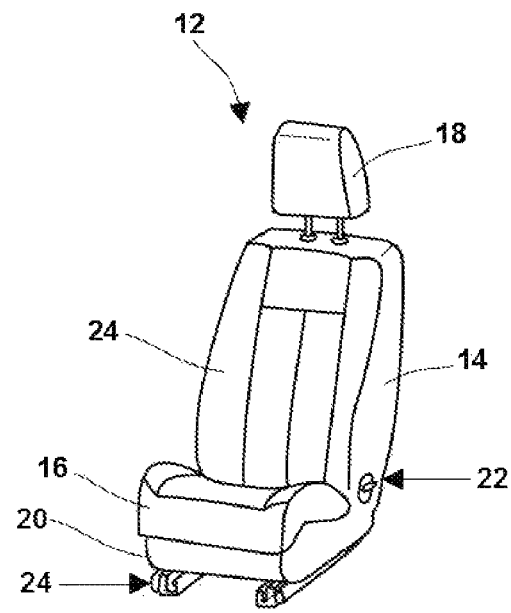
FIG. 2A is a perspective view of a vehicle seat assembly, according to an exemplary embodiment.

Referring now to FIG. 2A, a seat assembly 12 is shown. The seat assembly 12 can include a seat back 14 to provide comfort, support and protection to the seated occupant. A seat base 20 is operatively connected to the seat back, and likewise provides comfort, support and protection to the seated occupant. A head restraint 18 is positioned at an upper end of the seat back 14. The seat assembly 12 includes a recliner mechanism 22 operatively connected to the seat back 14 and seat base 20, to provide rotatable adjustability of the seat back 14 with respect to the seat base 20. The seat assembly 12 is secured to the vehicle using a track assembly 24. The track assembly 24 of this example provides for adjustability or movement of the relative position of the seat assembly 12 for comfort or utility of the seated occupant. The seat assembly 12 can be selectively moved via the track assembly 24 manually or be motor driven. The seat back 14 can also include, for example, a foam pad, a trim cover, or the like, The seat back can also include a first and a second side bolster. The seat base 20 can also include, for example, a foam pad, a trim cover, or the like. The trim cover can be made from a variety of materials, such as, leather, vinyl, fabric, or the like. The seat assembly 12 illustrated is a one-occupant seat typically used in the front row of a vehicle, but may be incorporated into any seat assembly, such as, a second row bench, a third row fold flat sea the like, which may utilize any type of seat functionality for use within any vehicle.

Figure 2B:
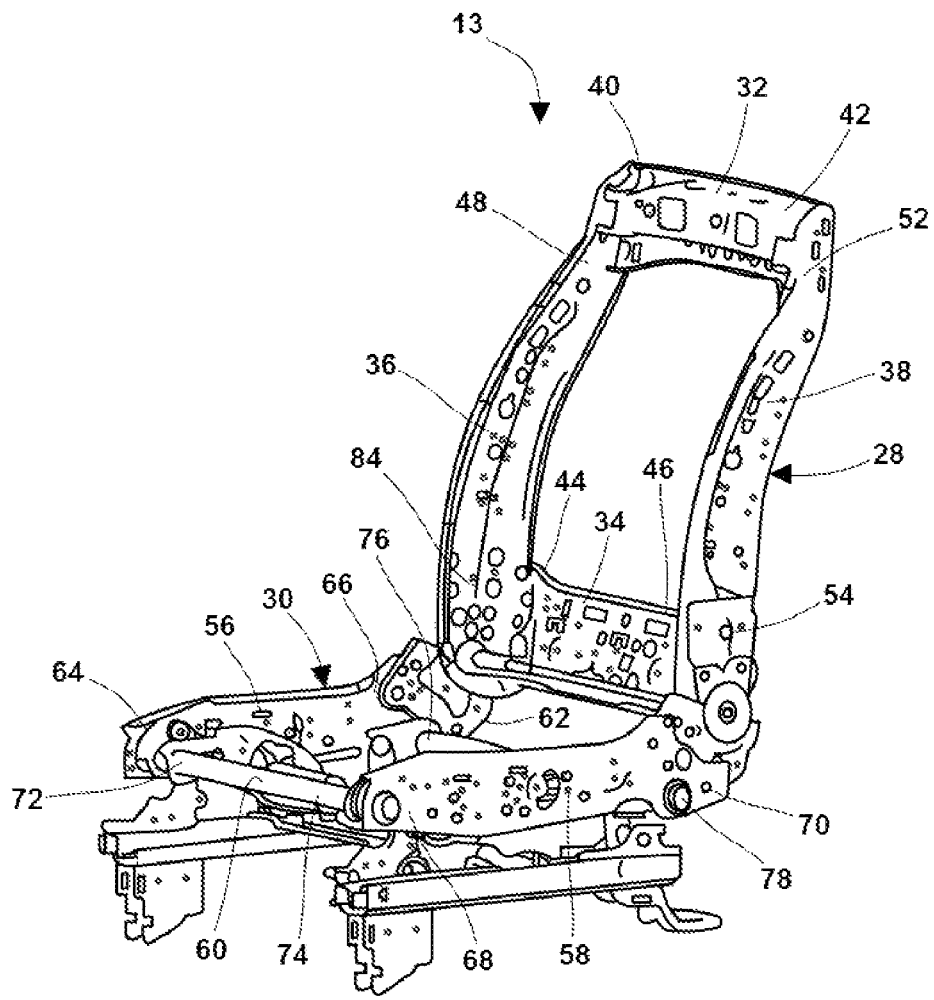
FIG. 2B is a perspective view of a vehicle seat frame, according to an exemplary embodiment.

The seat assembly also includes a seat frame 13, as shown in FIG. 2B. The seat frame 13 includes a seat back frame 28 and a seat base frame 30. The seat frame 13 includes a seat back frame 28, and a seat base frame 30. The seat back frame 28 includes an upper cross member 32, an opposed lower cross member 34, a first seat back side member 36, and an opposed second seat back side member 38. The upper cross member 32 includes a first and a second end 40, 42 and the lower cross member 34 includes a first and second end 44, 46. The first seat back side member 36 includes an upper end 48 and an opposed lower end 50 and the second seat back side member 38 includes an upper end 52 and an opposed lower end 54. The upper ends of the first and second seat back side members 48, 52 are coupled together by the upper cross member 32 and the lower ends of the first and second seat back side members 50, 54 are coupled together by the lower cross member 34 such that a substantially rectangular frame structure is formed. The seat base frame 30 includes a first seat base side member 56, an opposed second seat base side member 58, a front cross member 60, and an opposed rear cross member 62. The first seat base side member 56 includes a front end 64 and a rear end 66 and the second seat base side member 58 includes a front end 68 and an opposed rear end 70. The front cross member 60 includes a first end 72 and a second end 74, and the rear cross member 62 includes a first end 76 and a second end 78. The front ends of the first and second seat base side member 64, 68 are coupled together by the front cross member 60 and the rear ends of the first and second seat base side member 66, 70 are coupled together by the rear cross tube member 30 such that a substantially rectangular frame structure is formed. It should be noted that other seat frame designs can be used with the present disclosure, such as, a one-piece back frame or a one-piece seat base frame, or the like. The seat frame 13 can be made from a variety of materials, such as, metal, aluminum, composite material, or the like. Although a multi-piece seat back frame and seat base frame are shown, it is contemplated that any type of seat back frame and seat base frame may be used with the innovation described herein, such as, a one-piece seat back frame, tube frame, or the like. In addition, the frames and other components (such as, recliner mechanisms, reinforcement brackets, or the like) making up the seat assembly may be formed from a variety of different materials having different characteristics (such as, steel grade, composition, or the like) that are coupled together using various techniques, such as the method to be described below.

Figure 13:
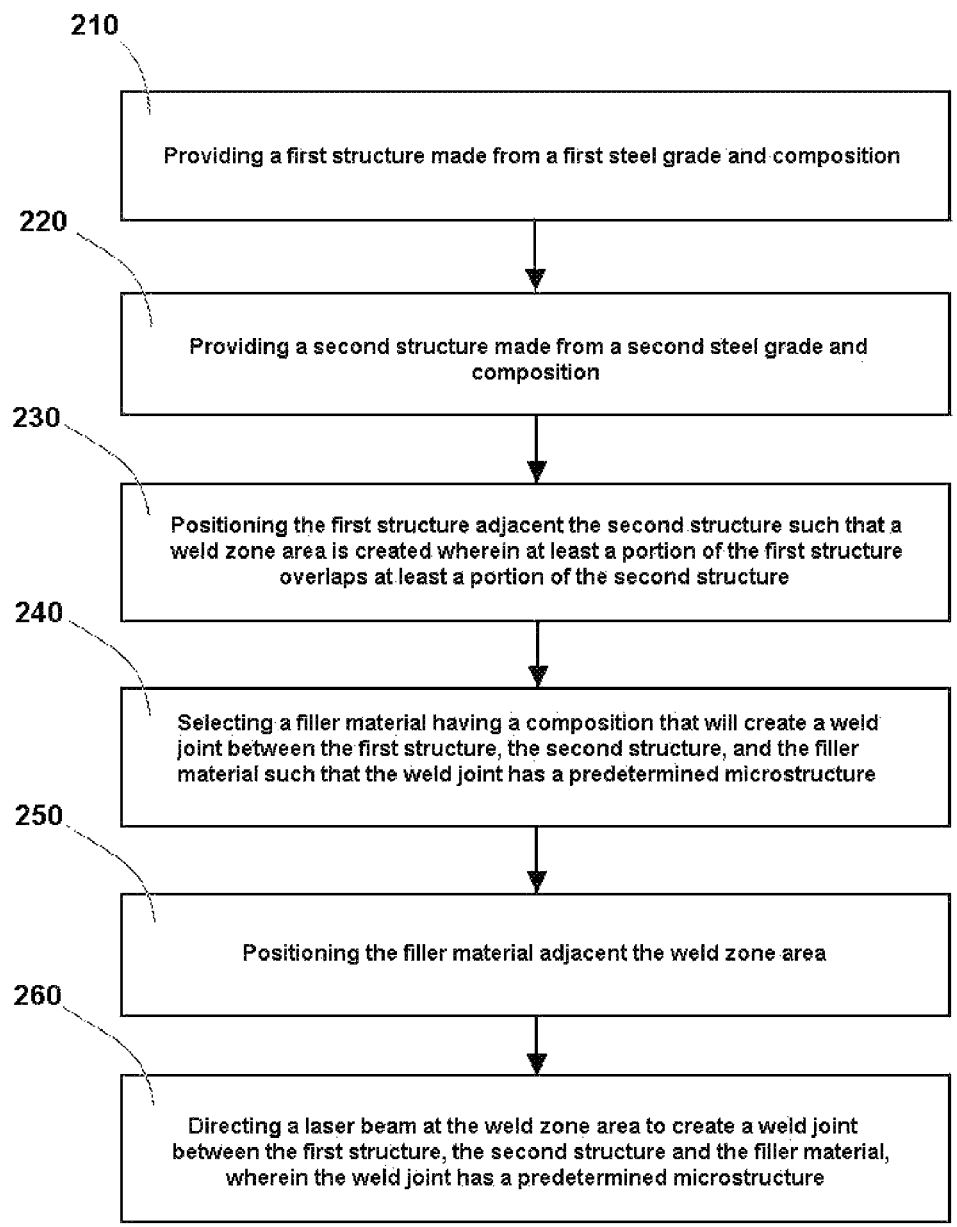
FIG. 13 is a flow chart detailing a method of laser welding a first structure made from a TWIP steel, a second structure made from a low carbon steel, and a filler material, according to an exemplary embodiment."

A method is disclosed herein that facilitates laser welding TWIP steels to low carbon steels and ensures seat structures formed from different steels have meet strength and performance requirements. The method is generally disclosed in FIG. 13.

The method begins at step 210 by providing a first structure 152 made from a first steel grade and composition, such as, TWIP steel. The first structure 152 may be a component of the seat frame 13 shown in FIG. 2B, such as, the first seat back side member 36, or the like.

The method proceeds to step 220 by providing a second structure 154 made from a second steel and composition, such as, a low to medium carbon steel (340XF HSLA). The second structure 154 may be another component of the seat frame 13 shown in FIG. 2B, such as, the upper cross member 32, or the like.

The method proceeds to step 230 by positioning the first structure 152 adjacent the second structure 154 such that a weld zone area 153 is created wherein at least a portion of the first structure 152 overlaps at least a portion of the second structure 154.

The method proceeds to step 240 by selecting a filler material 158 having a composition that will create a weld joint 150 between the first structure 152, the second structure 154, and the filler material 158 such that the weld joint 150 has a predetermined microstructure.

The method proceeds to step 250 by positioning the filler material 158 adjacent the weld zone area 153. The filler material 158 can be a variety of predetermined materials, such as, STS310 filler material, or the like. The filler material 158 may be positioned at the weld zone area 153 in a variety of predetermined manners. For example, the filler material 158 may be positioned in between the first structure 152 and the second structure 154; in a surface groove 169 located on the surface of the first structure 152 and/or the second structure 154 and between the first structure 152 and the second structure 154; on the outer surface of the first structure 152 and/or the second structure 154, or the like.

The method proceeds to step 260 by directing a laser beam (L) at the weld zone area 153 to create a weld joint 150 between the first structure 152, the second structure 154, and the filler material 158, wherein the weld joint 150 has a predetermined microstructure, such as, an austenitic microstructure. The laser beam (L) can be produced using a variety of laser welding machines, such as, solid-state lasers, gas lasers, fiber lasers, or the like. The laser welding techniques and method are described in further detail below.

Figure 3:
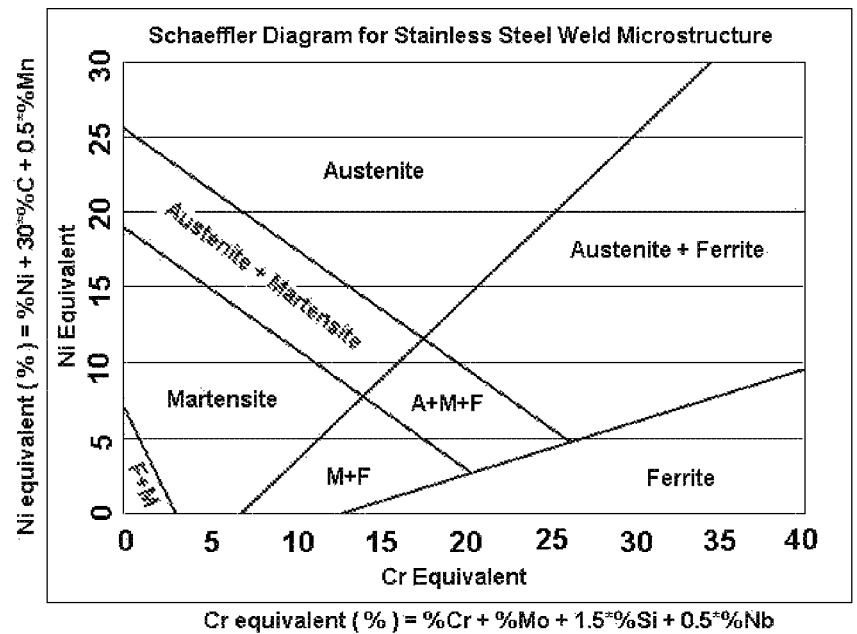
FIG. 3 is a Schaeffler diagram for predicting weld microstructures of stainless steel.

Referring to FIG. 3, a Schaeffler diagram for predicting weld microstructures of stainless steel is shown. The chemical composition of the steel is used to calculate a nickel(Ni) and chromium (Cr) equivalent that is plotted on the diagram. When the nickel and chromium equivalency are plotted on the diagram, the expected microstmcture can be predicted. The Schaeffler diagram of FIG. 3 can be used to identify the microstructure of a stainless steel and a low carbon steel weldment using various tiller materials to the weldment. The nickel and chromium equivalency can be adjusted within the filler material to achieve a weld microstructure that is austenitic and thus exhibiting strong and ductile properties. Although TWIP steel is not classified as a stainless steel, TWIP steel does share similar characteristics as an austenitic stainless steel. Therefore, the Schaeffler diagram is now used to predict microstructures of the base material as well as any weldments of it to other steel alloys. For welding TWIP steels to low carbon steels the Schaeffler diagram is used to estimate the microstructure that will be formed based upon the initial chemical composition of the materials being joined and their assumed proportions. If the composition falls within the martensite region then the weld will be brittle for certain applications. If it falls within the austenite region then it will be strong and ductile for certain applications such as in a vehicle seat frame structure. If it falls within the dual or triple phase regions then the brittleness will depend upon the relative amount of martensite formed. Filler materials are commercially available for metal inert gas (MIG) and tungsten inert gas (TIG) welding of low carbon to stainless steels. The composition of the filler materials are selected to achieve an austenitic microstructure.

Figure 4:
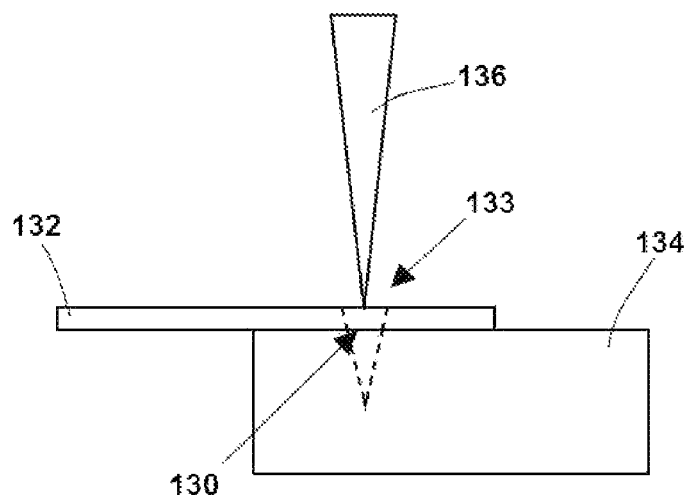
FIG. 4 is a schematic diagram of a laser weld joint in a TWIP/low carbon steel combination, according to an exemplary embodiment.

Referring next to FIG. 4, a schematic diagram of a laser weld or joint 130 between a first structure or work piece 132 and a second structure or work piece 134. In this example, the first structure is a piece of TWIP steel and second structure is a piece of low to medium carbon steel, such as, 340XF high strength low alloy (HSLA) steel, or the like. The laser beam 136 is directed at a weld zone 133 which causes both the TWIP and 340XF HSLA steels to melt together. When the laser energy is removed the mixture solidifies. The microstructure of this weld 130 can be predicted by plotting the weld mixture on the Schaeffler diagram. The resulting weld 130 microstructure results in a brittle, martensitic structure.

Figure 5:
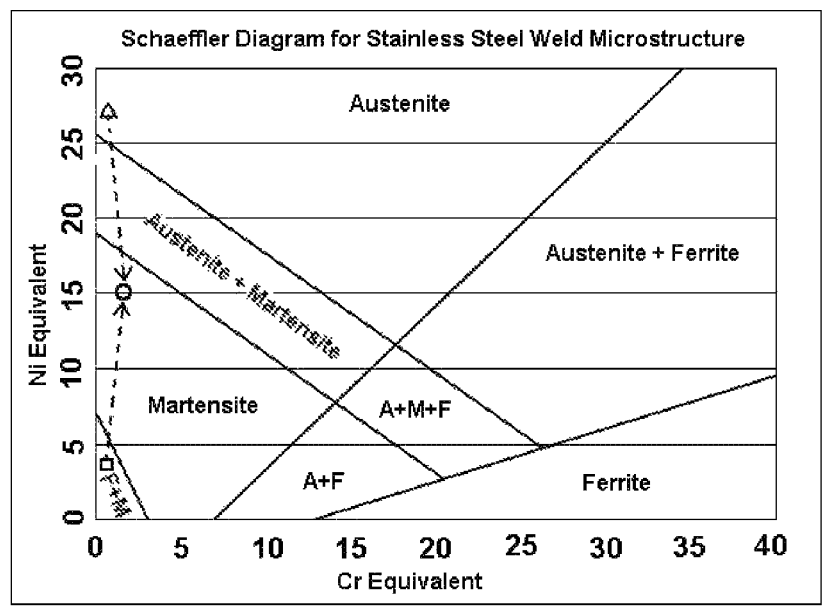
FIG. 5 is a Schaeffler diagram for predicting weld microstructures of stainless steel of TWIP and 340XF steels.

Referring now to FIG. 5, a Schaeffler diagram with the nickel and chromium equivalency plotted for both a TWIP steel and a 340XF HSLA steel and for predicting weld microstructures of TWIP and 340XF HSLA steels is shown. The nickel and chromium equivalency place the TWIP steel in the austenitic microstructure region of the diagram. The composition of a low carbon steel, such as, a HSLA alloy steel, SAE J2340 340XF HSLA steel, or the like, falls within the dual phase ferrite and martensite region of the diagram (in the case of HSLA it is >99% ferrite). If the two alloys are welded together, such as by laser welding, the weldment will become a new mixture of approximately 50% TWIP and 50% 340XF. The nickel and chromium equivalency of this 50:50 mixture when plotted on the Schaeffler diagram falls within the martensite region of the diagram. When laser welded together (assuming 50:50 mixing), the combination of the TWIP and low-carbon steel would produce a microstructure that is 100% martensitic. A weld having this microstructure will be brittle and will exhibit poor performance in certain applications such as a seat structure (e.g., vehicle seat, seat frame, seat base, seat back, etc.) or other applications where the structure is designed as a load carrying member and therefore will be unsuitable for such structural applications.

Figure 6:
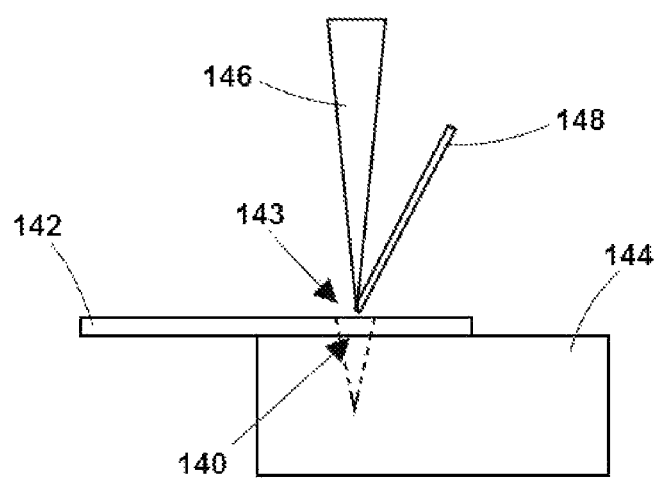
FIG. 6 is a schematic diagram of a laser weld joint created by introducing a weld filler material, according to an exemplary embodiment.

Referring next to FIG. 6, a schematic diagram of a laser weld or joint 140 created by introducing a weld filler material 148 is shown. The laser weld 140 is between a first structure or work piece 142 and a second structure or work piece 144. In this example, the first structure 142 is a piece of TWIP steel and the second structure 144 is a piece of 340XF HSLA steel where the weld filler material 148 is introduced to the weld zone 143 while the laser energy is applied to the weld zone area 143. The energy of the laser beam 146 causes the TWIP steel, the 340XF HSLA steel, and the weld filler material 148 to melt together. When the laser energy is removed, the mixture solidifies forming a microstructure. In one exemplary embodiment, the weld 140 is made with a higher nickel and/or chromium content such that the microstructure will be altered to provide a more favorable microstructure for certain applications such as a seat structure (e.g, vehicle seat, seat frame, seat base, seat back, etc,) or other applications where the structure is designed as a load-carrying member. If this material is added to the weld in a ratio of 33:33:33 (TWIP to HSLA to STS310) then the weld composition will be fully austenitic and the weld 140 will becomes compatible in terms of strength with the base TWIP steel and the HSLA steel. The difficultly with this process is that the actual weld chemistry (composition) will be affected by the amount of flller 148 that is added. If the proper dilution is not achieved then the weld 140 may be embrittled by forming martensite when austenite is desired.

Figure 7:
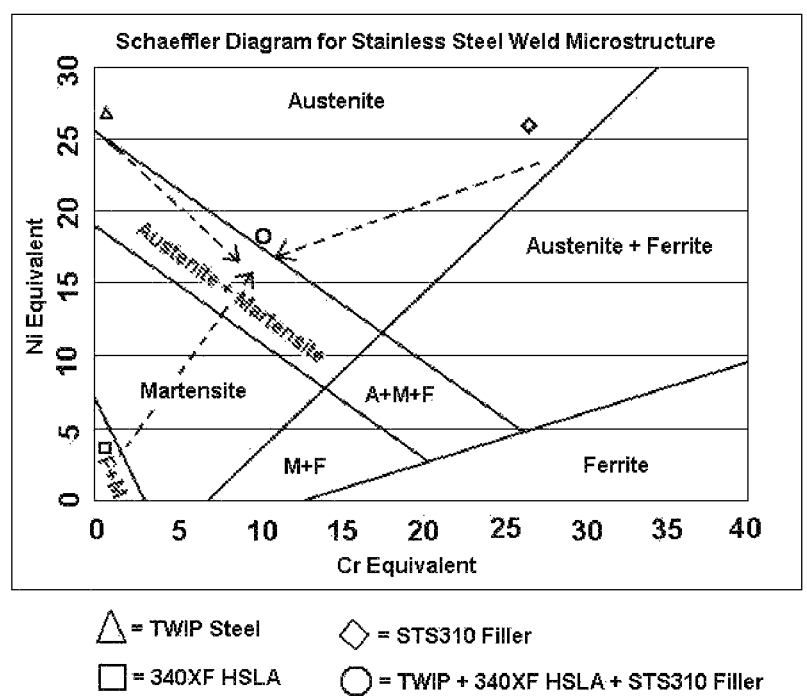
FIG. 7 is a Schaeffler diagram showing the effect on the weld microstructure when a filler material is used.

Referring now to FIG. 7, a Schaeffler diagram showing the effect on the weld microstructure when using the filler material 148. Here, the filler material 148 is a third alloy that has been introduced into the weld in a dilution ratio of 33:33:33. The third alloy is identified here as an STS310 filler material with the nickel and chromium equivalency that places the alloy into the austenitic region of the Schaefller diagram. The weld 140 would thus be a dilution of the TWIP steel, 340XF HSLA steel, and the STS310 and result in an austenitic microstructure. The austenitic microstructure is strong and ductile and is ideally suited for load carrying members such as seat structures (e.g., welded seat frames, seat back, seat base, etc.).

The laser beam 146 provides heat (energy) to both the work pieces 142, 144 and the filler material 148 simultaneously while the filler material 148 is fed at the proper rate and traversed with the laser beam 146 in complete synchronization. In order to ensure that the structure does not become mostly martensitic and result in an unacceptably brittle weld, a 33:33:33 ratio of the steel materials is achieved in the weld zone or pool 143. The weld speed is slowed, as needed, to accommodate movement of the filler 148 to the joint 140. The filler material 148 is added as a mixture between the first structure (TWIP steel) 142 and the second structure (low carbon steel) 144. It is important to add enough nickel and/or chromium to ensure that the weld 140 falls within the austenite region of the diagram after welding is complete. This can be controlled by using the appropriate volume and the purity of nickel and/or chromium used. According to the Schaeffler diagram if a region has a single phase then 100% of the microstructure will be that phase. If a region has two phases then the relative proportion of each is not immediately obvious from the diagram. Generally, however, as the microstructure is plotted closer to a particular boundary region (e.g., Austenite, Austenite+Martensite, Austenite+Ferrite, etc.) on the diagram the microstructure will have a higher percentage of phase corresponding to that boundary region.

Figure 8:
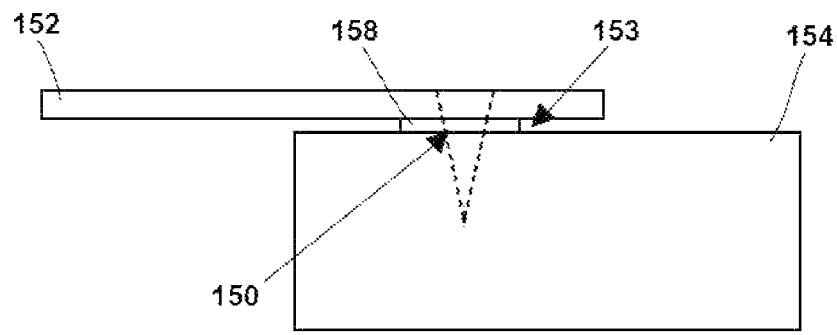
FIG. 8 is a schematic diagram for creating a laser weld that is alloyed to achieve an austenitic structure after laser welding.
Figure 9:
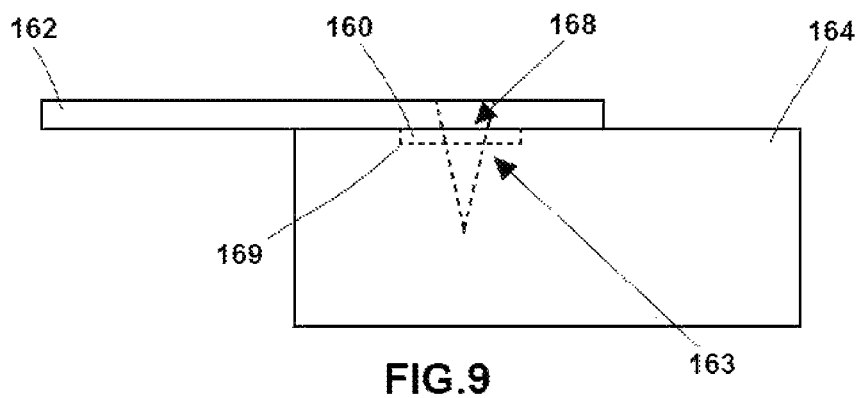
FIG. 9 is a schematic diagram for creating a laser weld that is alloyed to achieve an austenitic structure after laser welding.
Figure 10:
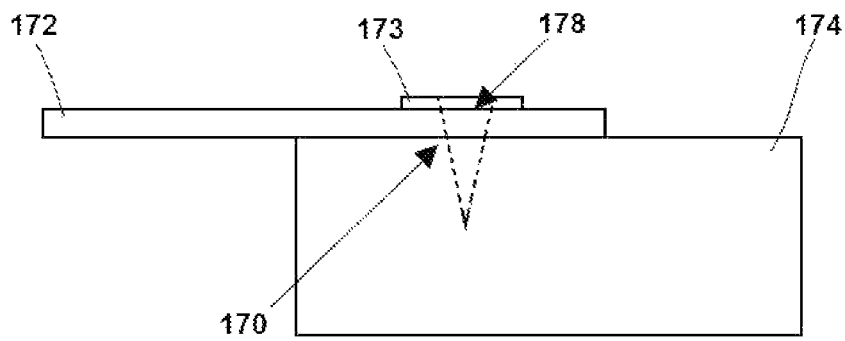
FIG. 10 is a schematic diagram for creating a laser weld that is alloyed to achieve an austenitic structure after laser welding.

Referring now to FIGS. 8-10, a schematic diagram of techniques used to create a laser weld that is alloyed to achieve an austenitic structure after laser welding is shown. It is difficult to easily provide weld filler material using the technique, as shown in FIG. 6 and discussed above. For example, when a seat structure, such as, a recliner, or the like is welded to another seat structure, such as, a seat back side member, the area around the weld provides very little clearance and thus insufficient space to introduce a filler material to the location of the laser weld. The weld must have the proper nickel and chromium equivalency when it solidifies to create a microstructure of austenite. A microstructure with martensite will be brittle and will not meet the structural requirements. The techniques shown in FIGS. 8-10, however, enable the filler material to be present at the time of the weld creation by placing the filler material at the location (e.g., in/on/between/adjacent a joint, etc.) to be welded before the welding process is performed.

Referring to FIG. 8, the method may also include the step of depositing a filler material 158 a first structure 152 and a second structure 154. In this example, the first structure 152 is a TWIP steel, the second structure 154 is a low to medium carbon steel, such as HSLA, and the filler material 152 is a layer of high Ni, high Cr filler alloy such as STS310, or the like. The filler material 158 may be introduced to the weld zone 153 in a variety of predetermined methods such as deposited as a tape, chemical vapor deposited, laser metal deposited, spray formed, painted, or using any other suitable coating method. The filler material 158 can be positioned either on the surface of the first structure 152 (TWIP), the surface of the second structure 154 (HSLA), or both. The width and thickness of the deposition layer is sized and located such that the laser beam (L) will fully melt the coating along with the TWIP/HSLA and form a weld joint 150 that is fully austenitic and compatible with the base materials.

Referring now to FIG. 9, the method may also include the step of depositing a filler material 168 in an opening 169 between a first structure 162 and a second structure 164. The opening 169 may be a surface groove, depression, ring, hole, or the like, located on the first structure 162, the second structure 164, or both. In this example, the first structure 162 is a TWIP steel, the second structure 164 is a low to medium carbon steel, such as HSLA, and the filler material 168 is a layer of high Ni, high Cr filler alloy such as STS310, or the like, deposited in a surface groove of the second structure 164. The advantage of this embodiment is that the fit between the first structure 162 (TWIP) and the second structure 164 (HSLA) components is much better after welding because the surfaces of the components are directly adjacent one another (i.e., flush) as opposed to having a gap, as shown in the previous embodiment (FIG. 8). It should be noted that the schematics are illustrative of the process but do not suggest all manners in which the Ni/Cr layer may be introduced. Furthermore, it is most cost effective if there is no excess of Ni/Cr layer beyond the weld 160 but that it is all consumed during welding. However for schematic representation it is shown extending beyond the final laser weld.

Referring now to FIG. 10, the method may also include the step of depositing a filler material 178 on the top surface of the first structure 172 and/or second structure 174. In this example, the first structure 172 is a TWIP steel, the second structure 174 is a low to medium carbon steel, such as HSLA, and the filler material 178 is a layer of high Ni, high Cr filler alloy such as STS310, or the like. The first structure 172 is positioned directly adjacent the second structure 174 and the filler material 178 is deposited on the top surface of the first structure 172 to be welded at a particular weld area, such that the filler material is above both components to be welded.

Each of the techniques (FIGS. 8-10), take advantage of the fast welding rates inherent with laser welding and eliminate the improper dilution ratios that may occur with separate filler addition. For example, a suitable dilution ratio or mixture is in the austenite region of the Schaeffler diagram and an unsuitable dilution ratio or mixture is in the martensite region. The size of the laser weld fusion zone (e.g., weld width and depth based on laser input power, weld speed, etc.) is well understood and highly repeatable. Because of this repeatability it is possible to provide a layer of the Ni/Cr alloy in between the TWIP and HSLA steel that will provide a uniform dilution (mixture when laser welded that will fall within the austenite range) and can be accomplished at high welding rates. Pure Ni may be deposited in a sufficient layer to achieve an austenitic weld. Pure nickel and pure chromium could also be alloyed into the weld to achieve an austenitic microstructure. Although pure nickel or alloys mostly of nickel are preferred, other compositions are acceptable, such as, alloys of up to 60% Ni and 40% Cr, or the like. Commercial alloys such as AWS E310 and the like have other alloying elements but are also acceptable. Pure Cr may also be applied to achieve the austenitic weld microstructure. A ratio of Ni/Cr can be provided between the pure extremes as long as an austenitic weld microstructure is achieved. The best ratio is one that achieves the austenitic microstructure at the lowest cost. This can be estimated based on calculations of how much of the filler material will be needed based on its composition (e.g., pure Ni or an alloy). Generally, the higher nickel content alloys are preferable and the mixture of low carbon steel and TWIP should be biased toward higher concentrations of TWIP. By welding through the TWIP and limiting weld penetration into the low carbon steel, an austenitic weld will be created that requires the least amount of filler material. Alloys of Ni/Cr and Fe/Ni/Cr can further be optimized to take advantage of the physical metallurgical characteristics to enhance the welding rate and conditions.

According to yet another embodiment, spot welding can be employed as another joining process where no filler is added. By applying this concept to either the TWIP or HSLA, a sufficient weld can be created where it otherwise would be difficult. The filler material between two components to be welded will improve the spot weld strength by mixing with the two components to be welded.

Figure 11:
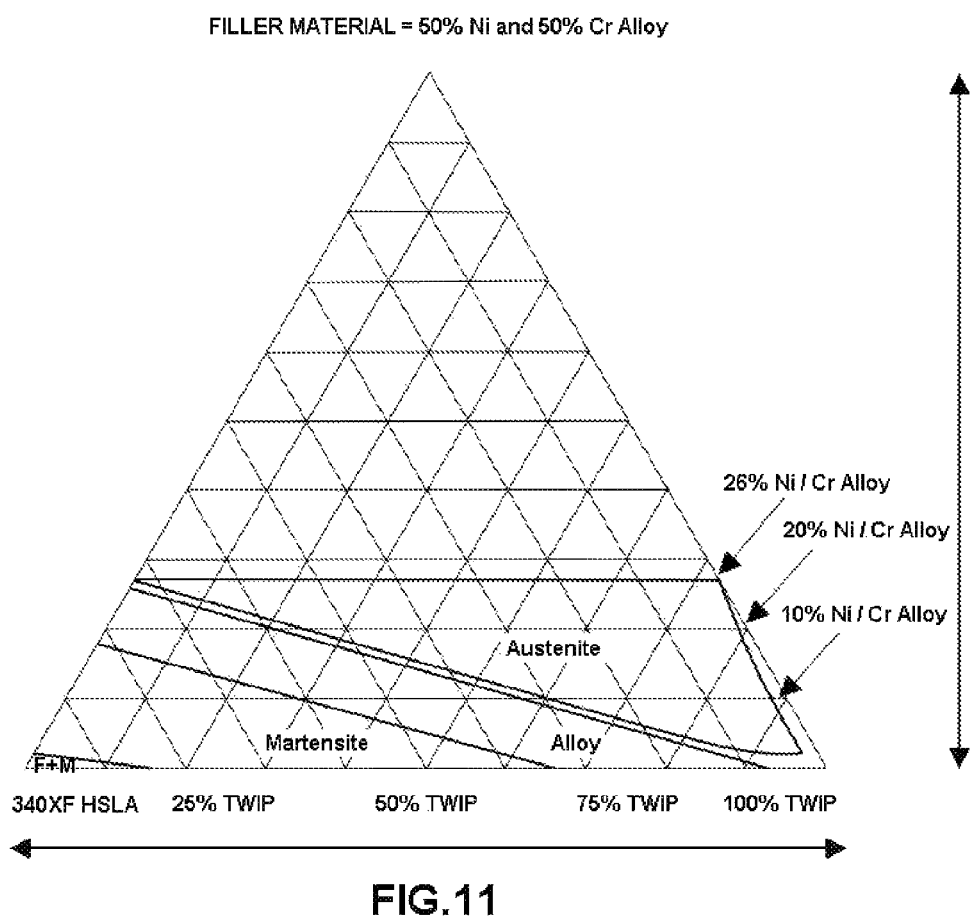
FIG. 11 is a schematic diagram showing the proportion of filler material comprising Ni and Cr that is required for a given TWIP concentration in the weld, according to an exemplary embodiment.

Referring now to FIG. 11, a schematic diagram showing the proportion of filler material comprising nickel and chromium (50% Ni and 50% Cr) that is required for a given TWIP concentration in the weld is shown. This diagram can be used in method step 240 to select the appropriate filler material to create the desired weld joint austenitic microstructure. The proportion of filler material in the weld is set primarily by the thickness of the filler material and secondarily by the weld conditions (e.g., power level, speed, etc.). The ratio of low carbon steel to TWIP in the weld is set by weld conditions (e.g., power level, speed, etc.). Generally, a lower proportion of filler material is required at higher TWIP concentrations in the weld (e.g., moving from 0% TWIP (100% 340XF HSLA) to 100% TWIP (0% 340XF HSLA)). If the filler material is 26% or greater in the weld then the weld will be austenite no matter what the proportion of TWIP is in the weld.

Figure 12:
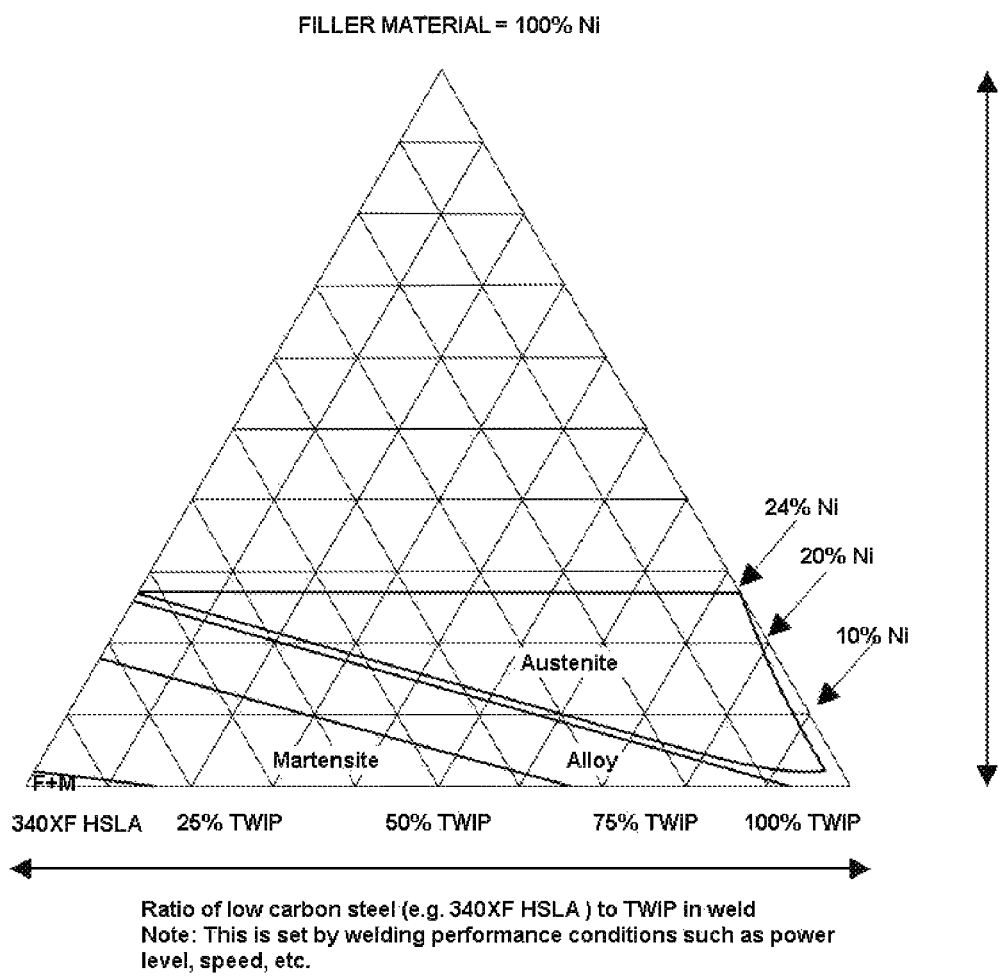
FIG. 12 is a schematic diagram showing the proportion of filler material comprising Ni that is required for a given TWIP concentration in the weld, according to an exemplary embodiment.

Referring to FIG. 12, a schematic diagram showing the proportion of filler material comprising Ni (100% Ni) that is required for a given TWIP concentration in the weld is shown. This diagram can be used in method step 240 to select the appropriate filler material to create the desired weld joint austenitic microstructure. The proportion of filler material in the weld is set primarily by the thickness of the filler material and secondarily by the weld conditions (e.g., power level, speed, etc.). The ratio of low carbon steel to TWIP in the weld is set by weld conditions (e.g., power level, speed, etc.). Generally, a lower proportion of filler material is required at higher TWIP concentrations in the weld (e.g., moving from 0% TWIP (100% 340XF HSLA) to 100% TWIP (0% 340XF HSLA)), as shown in the FIG. 8. If the volume of filler material is 24% or greater in the weld then the weld will be austenite no matter what the proportion of TWIP is in the weld.

Figure 14:
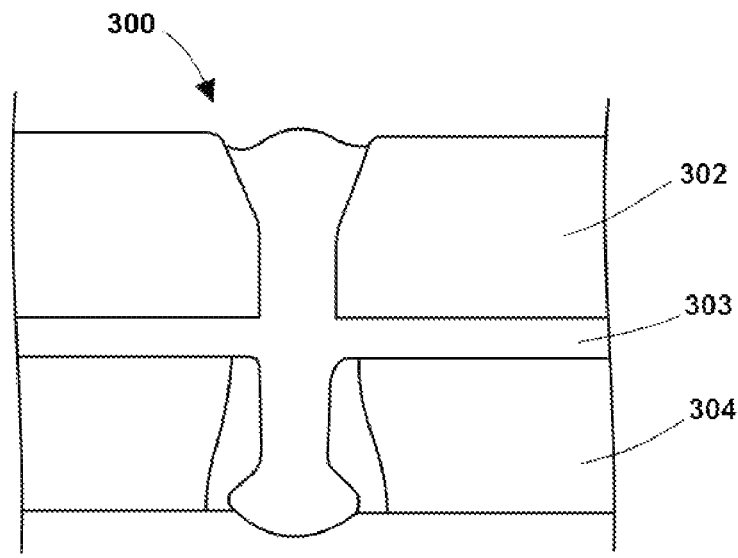
FIG. 14 is a micrograph of a laser weld between a first structure made from TWIP steel, a second structure made from lower carbon steel, and an H-214 alloy shim, according to another embodiment.
Figure 15:
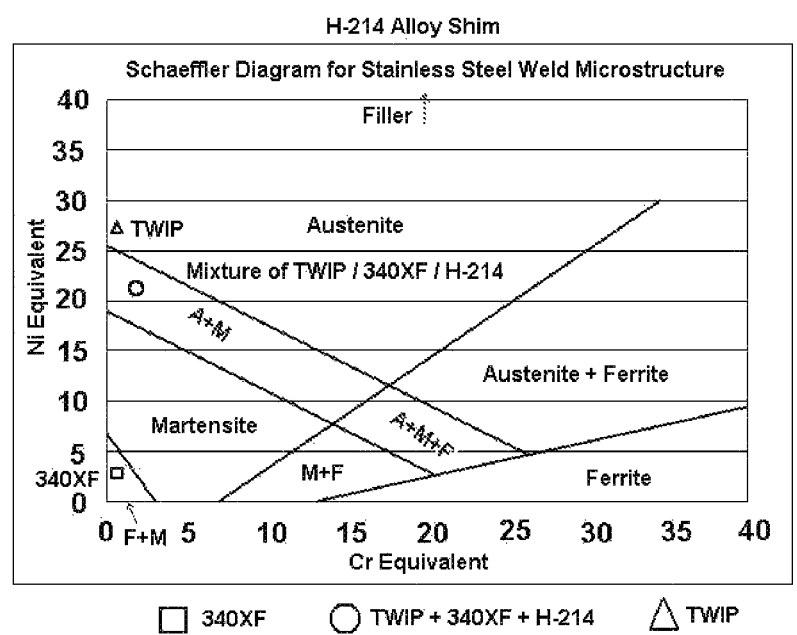
FIG. 15 is a Schaeffler diagram showing the effect on the weld microstructure when the H-214 shim stock of FIG. 14 is used.

Referring now to FIGS. 14-15, a laser weld 300 between a first structure 302, a second structure 303 and a shim 304 is shown according to another embodiment. In this example, the first structure 302 is a piece of TWIP steel, the second structure 304 is a piece of 340XF steel, and the shim 303 is a H-214 alloy shim stock. The H-214 shim stock 303 is expected to produce a weld 300 with a combination austenite and martensite microstructure, as shown in FIG. 15.

Figure 16:
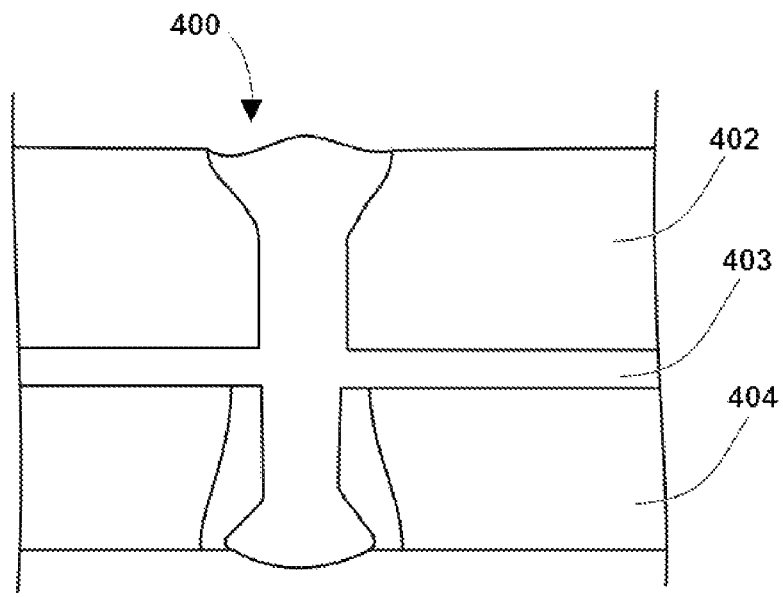
FIG. 16 is a micrograph of a laser weld between a first structure made from TWIP steel, a second structure made from lower carbon steel, and a Ni—Fe alloy shim, according to another embodiment.
Figure 17:
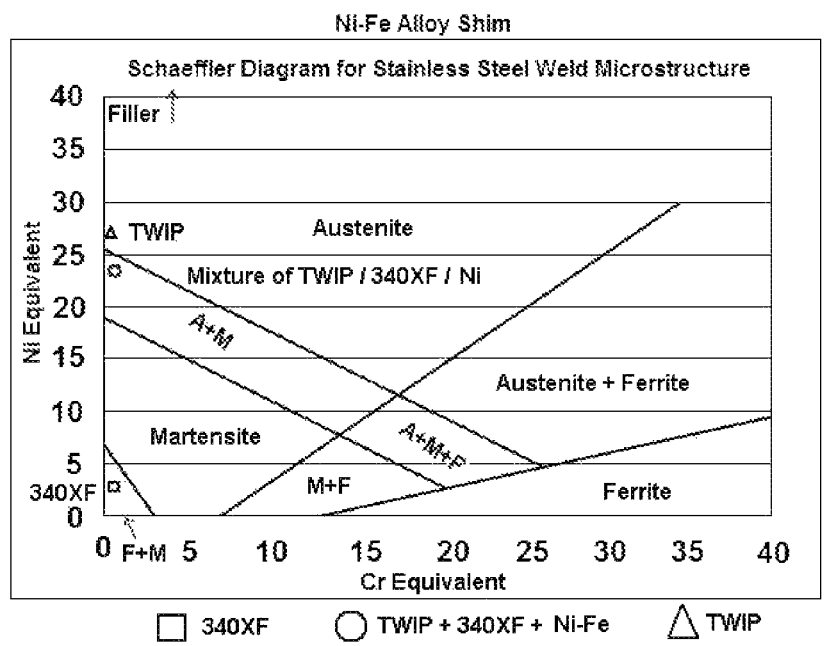
FIG. 17 is a Schaeffler diagram showing the effect on the weld microstructure when the Ni—Fe alloy shim stock of FIG. 16 is used.

Referring now to FIGS. 16-17, a laser weld 400 between a first structure 402, a second structure 404 and a shim 403 is shown according to still another embodiment. In this example, the first structure 402 is formed using a piece of TWIP steel, the second structure 404 is formed using a piece of 340XF steel, and the shim 403 is formed using a Ni—Fe alloy shim stock. The Ni—Fe shim stock 403 is expected to produce a weld 400 with a combination austenite and martensite microstructure, as shown in FIG. 15.

Figure 18:
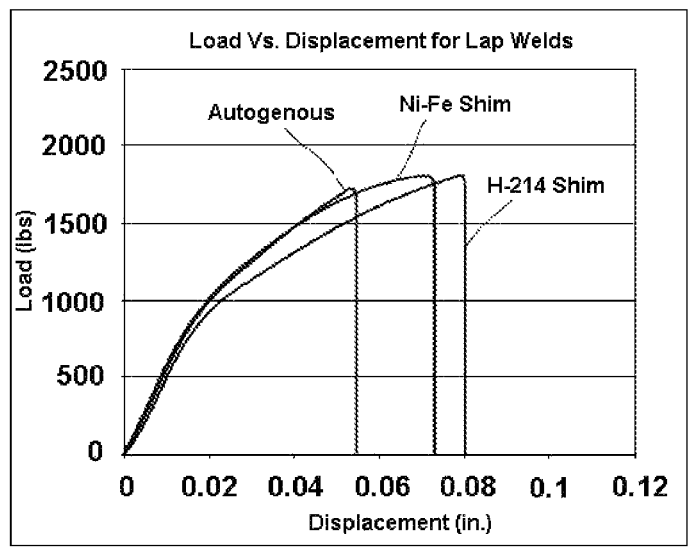
FIG. 18 is a graph showing the lap shear strength of laser welds of FIGS. 14 and 16.

Referring now to FIG. 18, a graph illustrating the lap shear strength of the laser welds of FIG. 14, FIG. 16, and autogenous (no shim stock) laser welds of TWIP to 340XF. The lap shear strength and ductility were improved in both instances in which a H-214 shim stock 303 and a Ni—Fe shim stock 403 were used when compared to an autogenous (no shim stock) laser weld between TWIP to 340XF.

Figure 19:
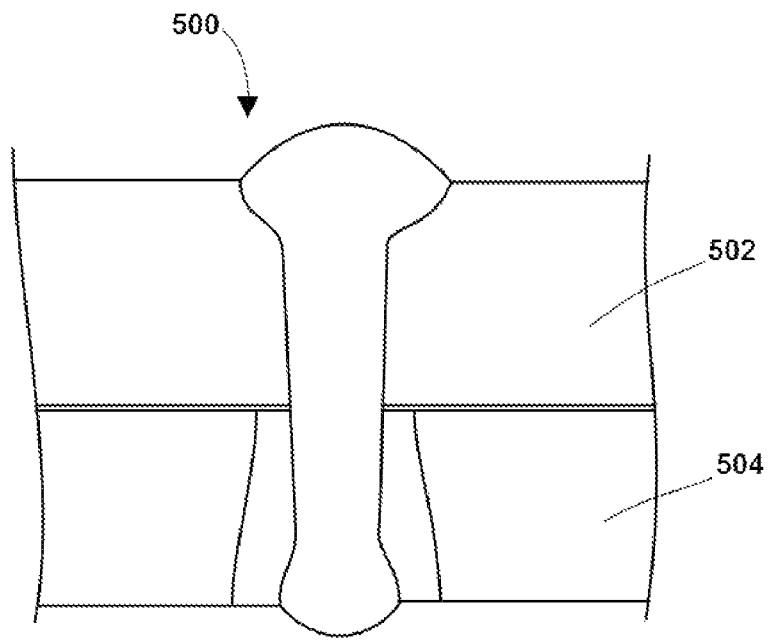
FIG. 19 is a micrograph of a laser weld between a first structure made from TWIP steel, a second structure made from lower carbon steel, and STS310 filler, according to another embodiment.
Figure 20:
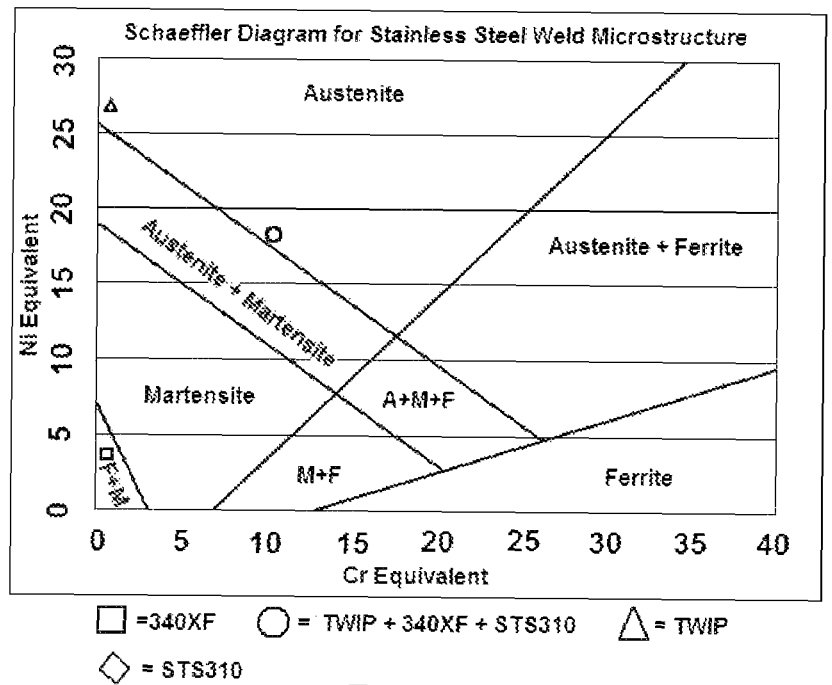
FIG. 20 is a Schaeffler diagram showing the effect on the weld microstructure when the STS310 filler of FIG. 20 is used.
Figure 21:
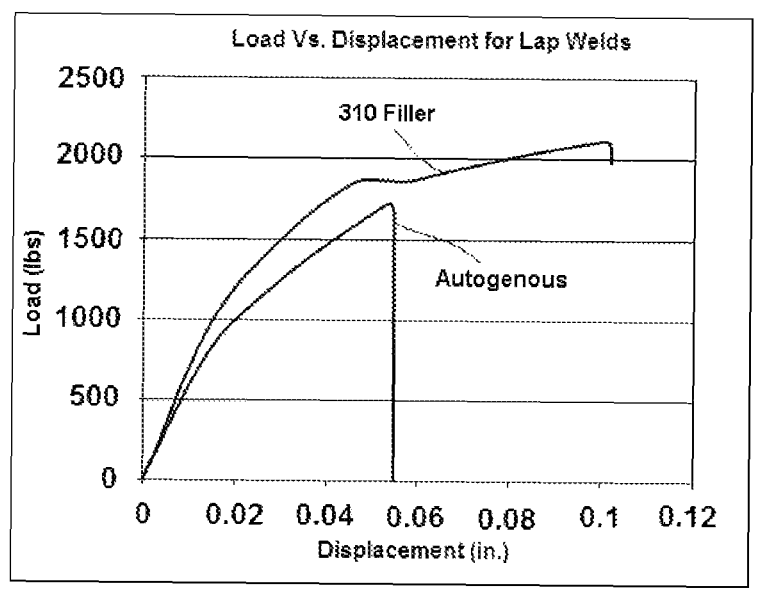
FIG. 21 is a graph showing the lap shear strength of laser welds of FIG. 19.

Referring now to FIGS. 19-21, a hybrid laser weld between a first structure 502, a second structure 504 and a filler 503 is shown using the method shown previously in FIGS. 6 and 7. In this example, the first structure is formed using a piece of TWIP steel, the second structure is formed using a piece of 340XF steel and the filler material 503 is formed using a STS310 filler. The addition of the STS310 filler is expected to produce a weld 500 with an austenite microstructure, as shown in FIG. 20. The lap shear strength and ductility were improved by the hybrid welding process using the STS310 filler when compared to an autogenous (no shim stock) laser weld between TWIP to 340XF.

Many modifications and variations of the present disclosure are possible in light of the above teachings. Therefore, within the scope of the appended claim, the present disclosure may be practiced other than as specifically described.

What is claimed is:

1. A method of laser welding together a vehicle seat having different steel grades, the method comprising the steps of:
providing a first seat structure having a first end, an opposed second end, an outer surface and an inner surface, the first seat structure made from a first steel grade;
providing a second seat structure having a first end, an opposed second end, an outer surface, and an inner surface, the second seat structure made from a second steel grade;
positioning the first seat structure first end adjacent the second seat structure first end to create a weld zone area, wherein at least a portion of the first seat structure first end overlaps at least a portion of the second seat structure first end;
selecting a filler material having a composition that will create a weld joint between the first seat structure first end, the second seat structure first end and the filler material such that the weld joint has a predetermined microstructure;
positioning the filler material adjacent the weld zone area; and
directing a laser beam at the weld zone area to form a weld joint between the first seat structure first end, the second seat structure first end, and the filler material, wherein the weld joint has a predetermined microstructure to form the vehicle seat;
wherein the first steel grade is made from TWIP steel;
wherein the second steel grade is made from low to medium carbon steel;
wherein the welding joint has an austenitic microstructure; and
wherein the filler material is a STS310 filler material having a nickel and chromium equivalency that is austenitic.

2. The method of claim 1, wherein the second seat structure is made from 340XF high strength low alloy steel.

3. The method of claim 1, further comprising the step of positioning the filler material at the weld zone between the first seat structure first end and the second seat structure first end.

4. The method of claim 1, further comprising the step of positioning the filler material at the weld zone area between the first seat structure first end and the second seat structure first end within a surface opening in at least one of the first seat structure first end and the second seat structure first end.

5. The method of claim 1, further comprising the step of positioning the filler material at the weld zone area on the outer surface of at least one of the first seat structure and the second seat structure.

6. The method of claim 1, wherein the first seat structure, the second seat structure, and the filler material form a weld joint having a dilution ratio of 33:33:33 resulting in an austenitic microstructure.

7. The method of claim 1, wherein the first seat structure and the second seat structure are joined to form a seat frame.

8. A method of laser welding together a vehicle seat structure having different steel grades, the method comprising the steps of:
   providing a first seat structure made from TWIP steel;
   providing a second seat structure made from 340XF high strength low alley steel;
   positioning the first seat structure adjacent the second seat structure to create a weld zone area wherein at least a portion of the first seat structure overlaps at least a portion of the second seat structure;
   selecting a STS310 filler material having a composition to form a weld joint between the first seat structure, the second seat structure and the filler material such that the weld joint has a austenitic microstructure;
   positioning the filler material adjacent the weld zone area; and
   directing a laser beam at the weld zone area to form a weld joint between the first seat structure, the second seat structure and the filler material, wherein the weld joint has a austenitic microstructure.

9. The method of claim 8, wherein the first seat structure, the second seat structure, and the filler material form a weld joint having a dilution ratio of 33:33:33 resulting in an austenitic microstructure.

\* \* \* \* \*